United States Patent [19]
Haraguchi

[11] Patent Number: 5,966,554
[45] Date of Patent: *Oct. 12, 1999

[54] APPARATUS ADAPTED TO FILM CARTRIDGE PROVIDED WITH OPENING-AND-CLOSING COVER

[75] Inventor: Shosuke Haraguchi, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/788,161

[22] Filed: Jan. 24, 1997

[30] Foreign Application Priority Data

Jan. 31, 1996 [JP] Japan .................................. 8-015549

[51] Int. Cl.$^6$ .............................. G03B 17/26; G03B 17/02
[52] U.S. Cl. ........................... 396/511; 396/513; 396/538
[58] Field of Search ...................... 396/360, 511, 396/512, 513, 516, 518, 522, 538

[56] References Cited

U.S. PATENT DOCUMENTS

| 5,600,393 | 2/1997 | Funahashi | 396/513 |
| 5,630,192 | 5/1997 | Kobayashi | 396/513 |
| 5,638,152 | 6/1997 | Stephenson, III et al. | 396/513 |

*Primary Examiner*—Eddie C. Lee
*Attorney, Agent, or Firm*—Robin, Blecker & Daley

[57] ABSTRACT

An apparatus adapted to a film cartridge provided with an opening-and-closing cover comprises an operating portion which operates the opening-and-closing cover of the film cartridge by rotating, a driving portion which rotates the operating portion, and an elastic portion which is disposed at the driving portion and urges the operating portion selectively in a direction in which the driving portion rotates the operating portion.

22 Claims, 8 Drawing Sheets

APPARATUS ADAPTED TO FILM CARTRIDGE PROVIDED WITH OPENING-AND-CLOSING COVER

BACKGROUND OF THE INVENTION

1. Field of the Invention

This invention relates to an improvement of an apparatus, such as a camera, adapted to a film cartridge provided with an opening-and-closing cover.

2. Description of Related Art

In recent years, there is proposed a film cartridge provided with a light-lock door which serves as an openable and closable light-shielding cover arranged to shield a film egress/ingress slot from light. For example, a film cartridge disclosed in U.S. Pat. No. 5,347,334 is such a type of film cartridge. The film cartridge of this type necessitates a camera to perform opening-and-closing control over the light-lock door. For this control, the camera must be provided with a novel mechanism which is unnecessary for cameras adapted for use of a 135 film. An example of this mechanism has been proposed in Japanese Laid-Open Patent Application No. HEI 7-92534. According to this proposal, the light-lock door is driven to open and close through a spring balance between a plurality of springs.

However, since a driving force of the proposed mechanism for opening and closing the light-lock door is determined by the spring balance, the driving force is unstable. In order to reliably ensure the operation of the mechanism, an extremely strong spring force is necessary, thereby disadvantageously requiring a heavy operation. An attempt to lighten the heavy operation, on the other hand, makes a reliable operation impossible. Further, the incorporation of the proposed mechanism causes an increase in size of the camera. However, no art for preventing such a mechanism from increasing the size of cameras has been known.

BRIEF SUMMARY OF THE INVENTION

In accordance with one aspect of this invention, there is provided an apparatus adapted to a film cartridge provided with an opening-and-closing cover, which comprises an operating portion which operates the opening-and-closing cover of the film cartridge by rotating, a driving portion which rotates the operating portion, and an elastic portion which is disposed at the driving portion and urges the operating portion selectively in a direction in which the driving portion rotates the operating portion, whereby the operation of the opening-and-closing cover of the film cartridge can be reliably ensured.

The above and other aspects and features of this invention will become apparent from the following detailed description of embodiments thereof taken in connection with the accompanying drawings.

DETAILED DESCRIPTION OF THE INVENTION

Preferred embodiments of this invention will be hereinafter described in detail with reference to the drawings.

Figure 1:
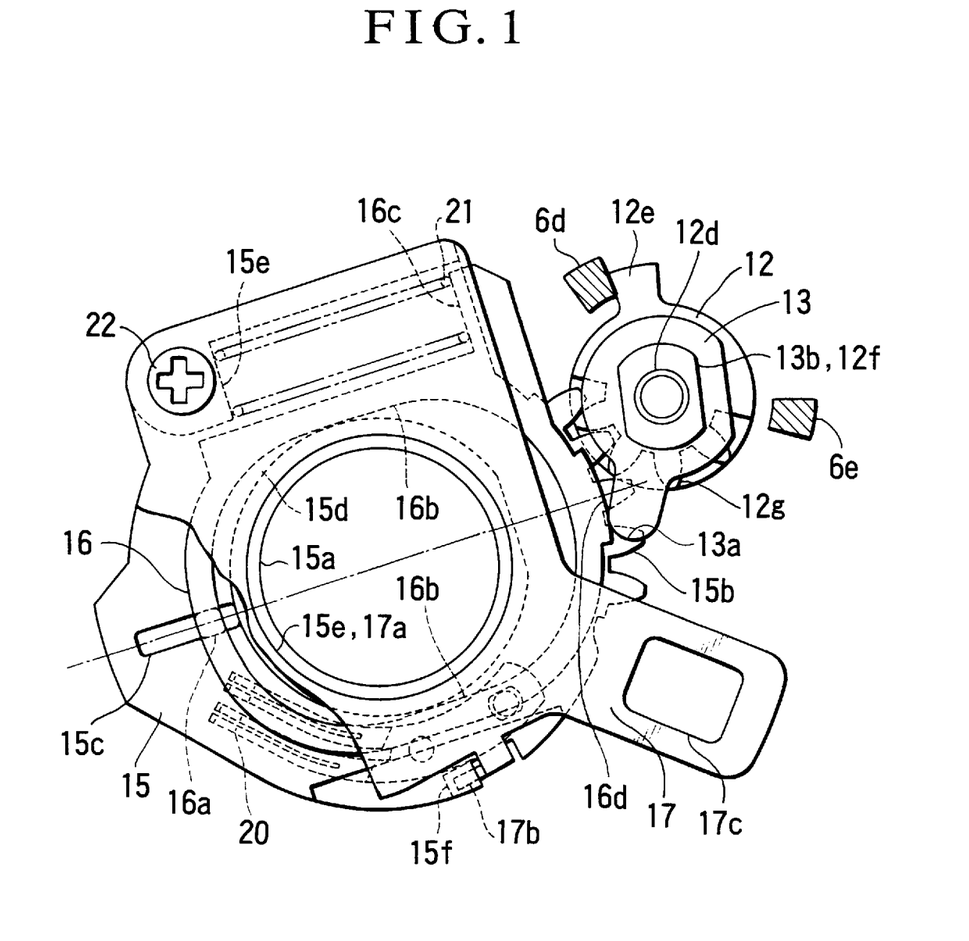
FIG. 1 is a plan view showing the bottom side of a cartridge loading chamber of a camera, as viewed from below, according to a first embodiment of this invention, in such an operating state as to have a light-lock door of a loaded film cartridge in a closed state.
Figure 2:
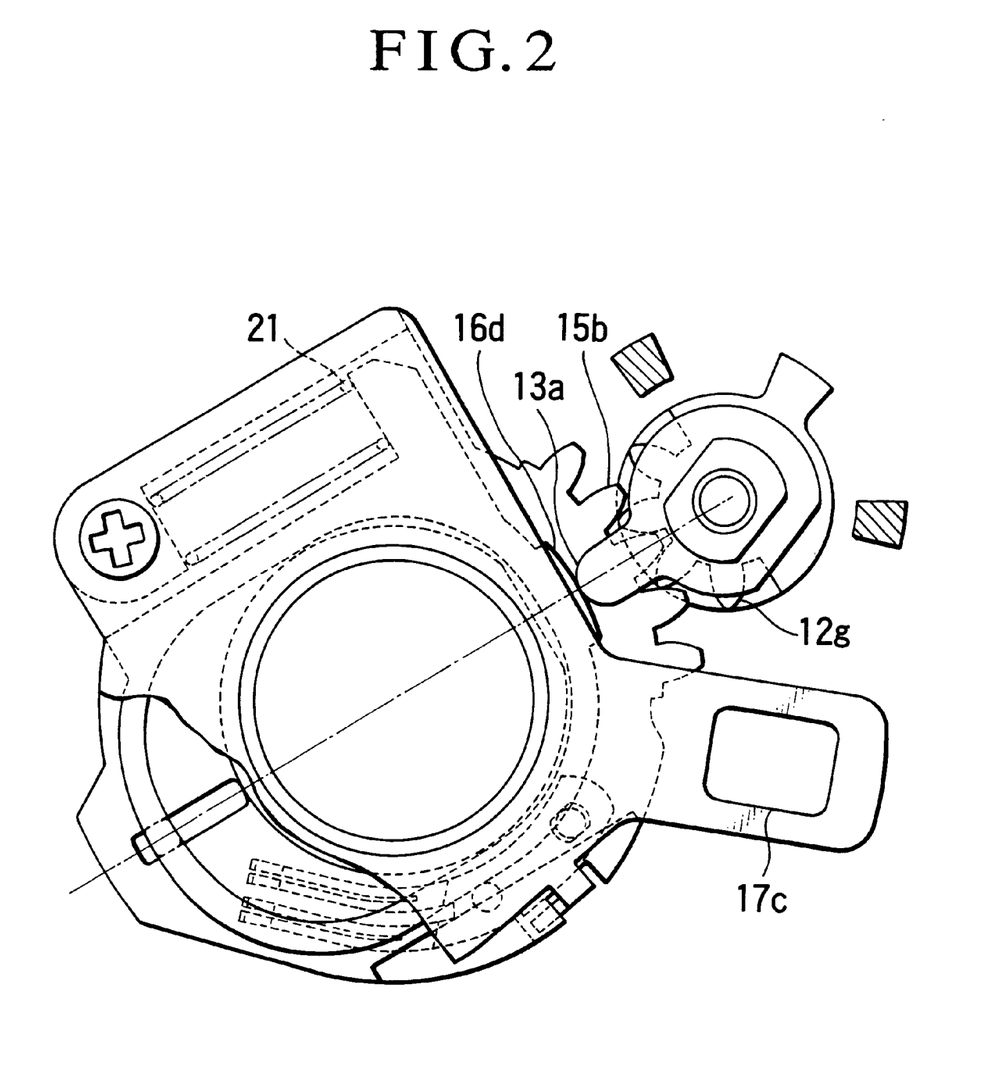
FIG. 2 is a plan view showing the bottom side of the cartridge loading chamber of the camera, as viewed from below, in such an operating state as to be in process of opening or closing the light-lock door of the loaded film cartridge.
Figure 3:
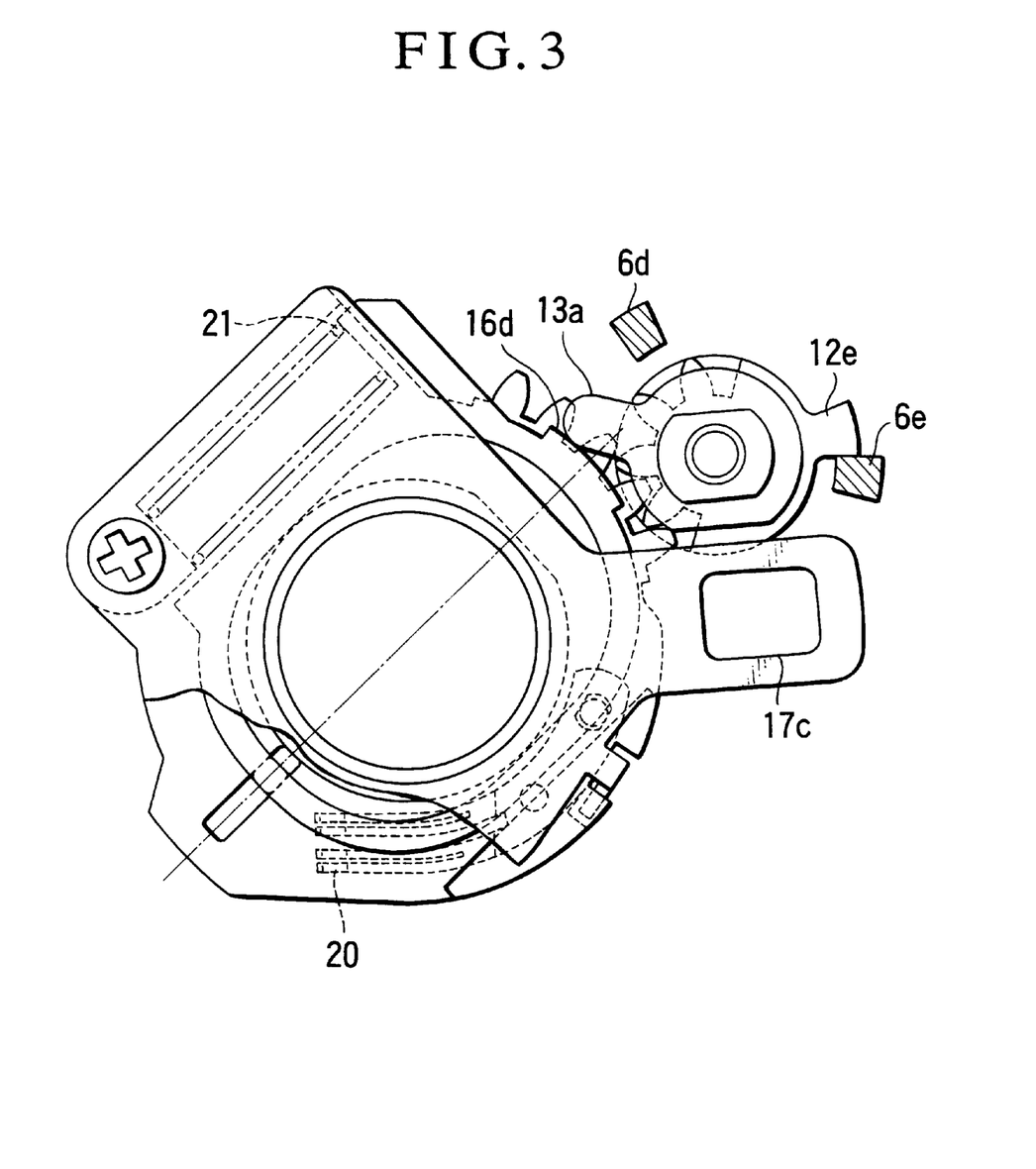
FIG. 3 is a plan view showing the bottom side of the cartridge loading chamber of the camera, as viewed from below, in such an operating state as to have the light-lock door of the loaded film cartridge in an open state.
Figure 4:
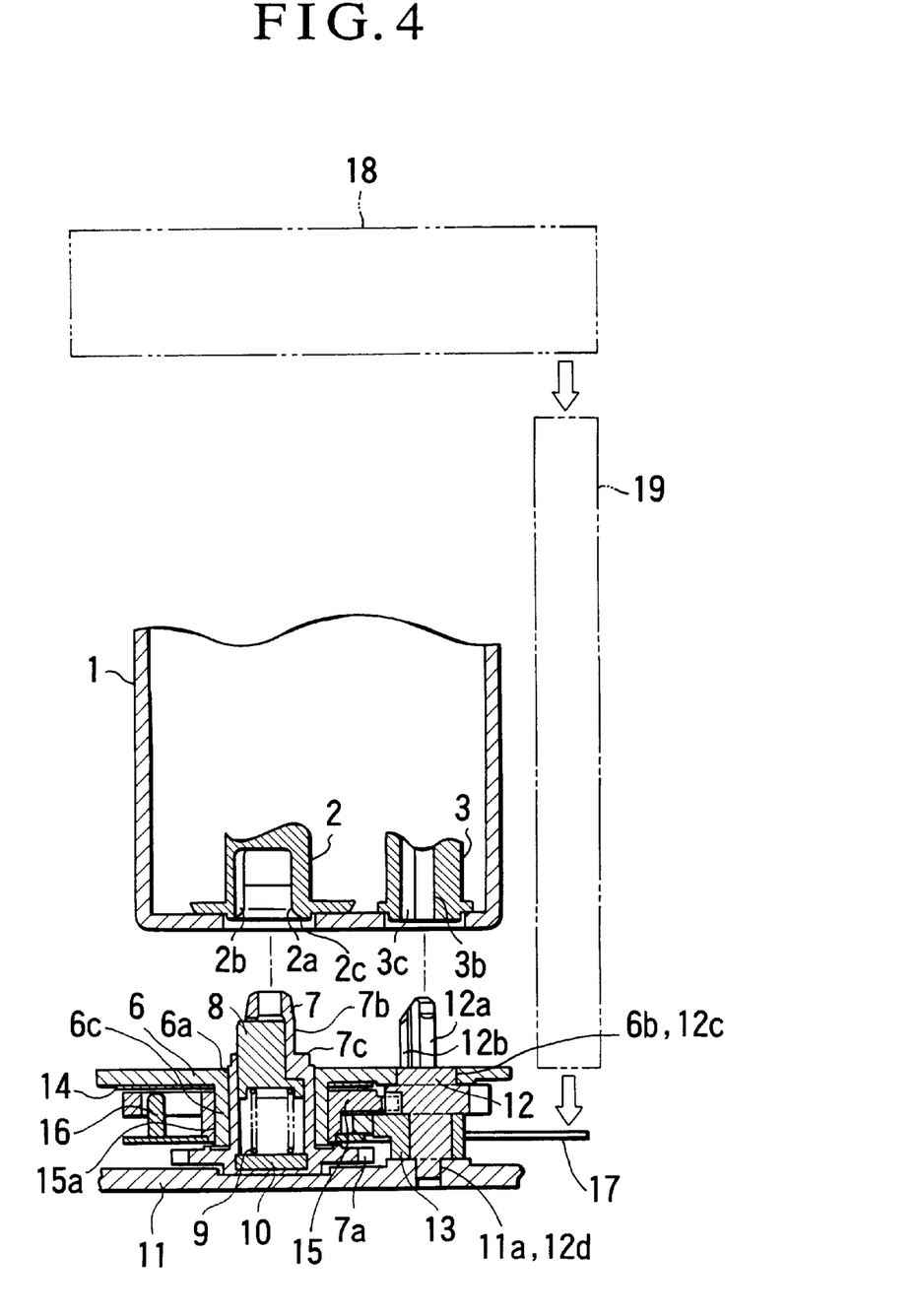
FIG. 4 is a vertical sectional view showing the cartridge loading chamber of the camera shown in FIG. 1.
Figure 5:
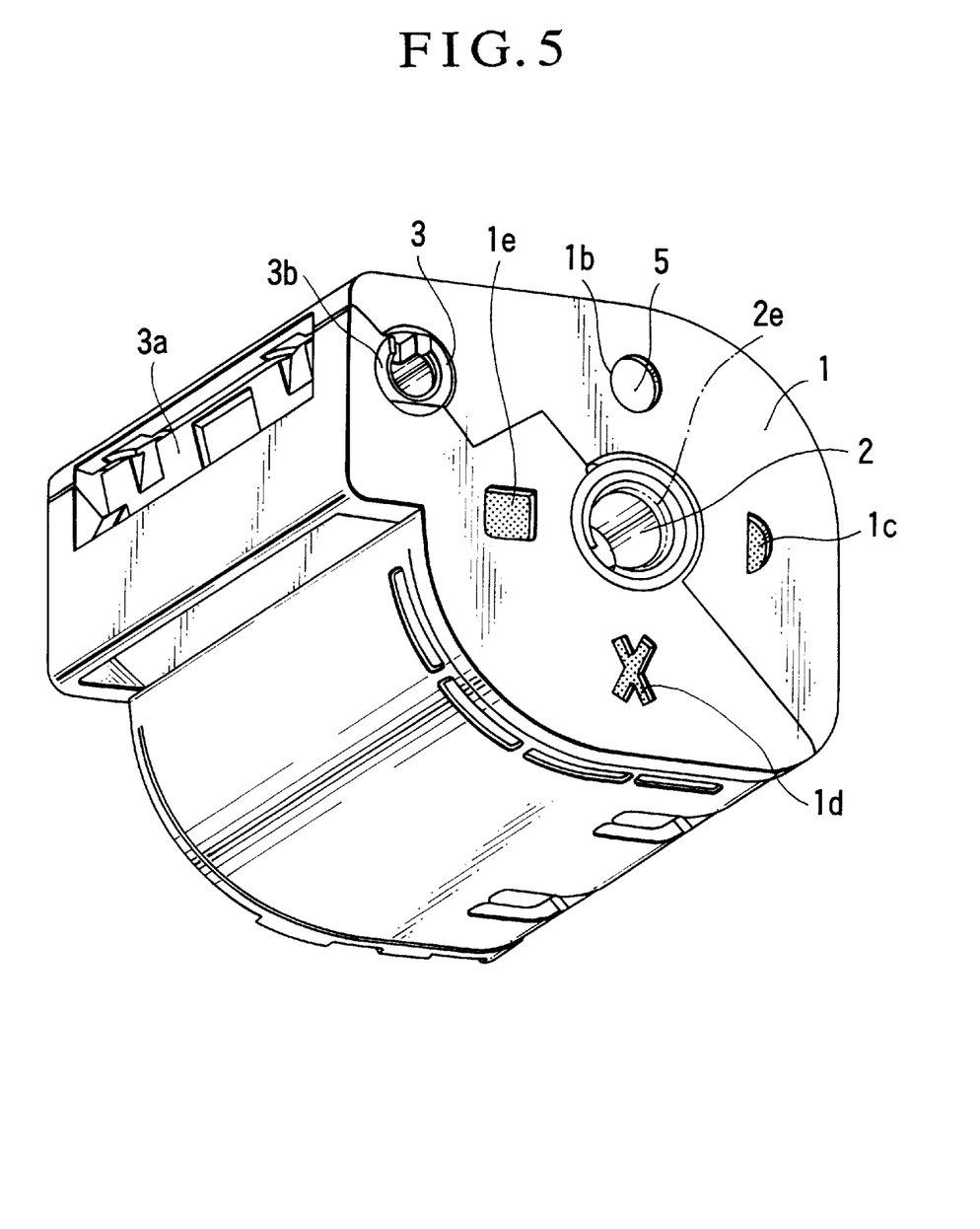
FIG. 5 is a perspective view showing a film cartridge to be used in the camera shown in FIG. 1.
Figure 6:
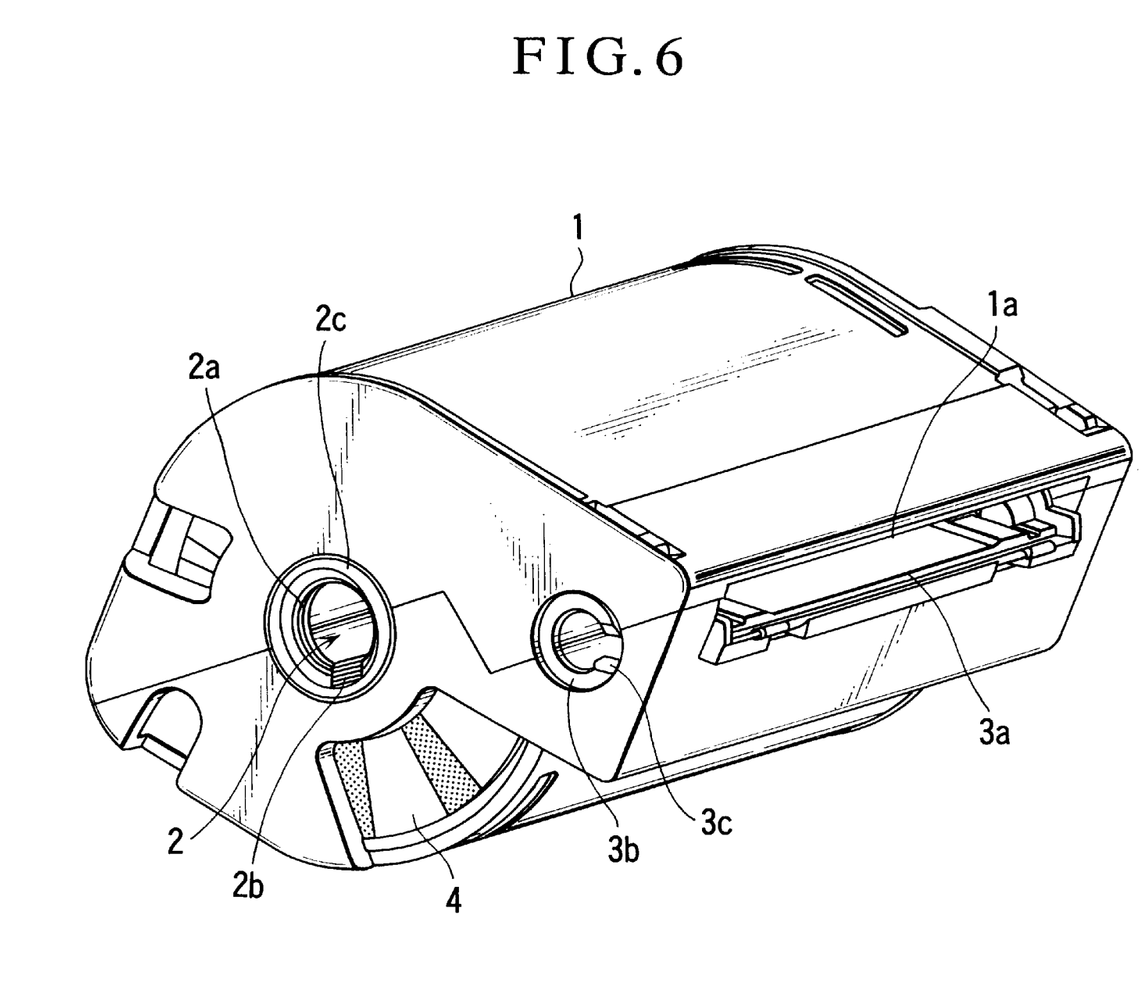
FIG. 6 is a perspective view showing the film cartridge shown in FIG. 5 as viewed from a different side thereof.

FIG. 1 is a plan view showing the bottom side of a cartridge loading chamber of a camera, as viewed from below, according to an embodiment of this invention, in such an operating state as to have a light-lock door of a loaded film cartridge in a closed state. FIG. 2 is a plan view showing the bottom side of the cartridge loading chamber of the camera, as viewed from below, in such an operating state as to be in process of opening or closing the light-lock door of the loaded film cartridge. FIG. 3 is a plan view showing the bottom side of the cartridge loading chamber of the camera, as viewed from below, in such an operating state as to have the light-lock door of the loaded film cartridge in an open state. FIG. 4 is a vertical sectional view showing the cartridge loading chamber of the camera shown in FIG. 1. FIG. 5 is a perspective view showing a film cartridge to be used in the camera shown in FIG. 1. FIG. 6 is a perspective view showing the film cartridge shown in FIG. 5 as viewed from a different side thereof.

Referring to FIGS. 5 and 6, the film cartridge to be used in the camera according to the embodiment of this invention is first described as follows. The film cartridge includes a film cartridge shell 1, a film supply spool 2 and a light-lock door 3. The light-lock door 3 has a door part 3a, which is arranged to open and close a film egress/ingress slot, and is pivotally supported by the film cartridge shell 1 for rotation. In addition to the door part 3a, the light-lock door 3 is provided with a shaft part 3b and an engaging part 3c for rotation transmission. When the light-lock door 3 is caused to rotate clockwise, as viewed in FIG. 6, by using the shaft part 3b and the engaging part 3c, the film cartridge is brought into a state shown in FIG. 6, in which the door part 3a is thus opened to permit a film (not shown) to be sent out from the film cartridge. When the light-lock door 3 is caused to rotate in the direction reverse to the above direction, i.e., counterclockwise, as viewed in FIG. 6, the film cartridge is brought into a state shown in FIG. 5, in which the door part 3a is closed to shield the film egress/ingress slot from light. The film supply spool 2 has a shaft part 2a, a key way part 2b and an abutting part 2c at its one end and a shaft part 2e at the other end. The film (not shown) is taken up onto the film supply spool 2 when the film supply spool 2 is caused to rotate counterclockwise, as viewed in FIG. 6, and is thrust out from an opening part 1a obtained in the open state of the door part 3a of the light-lock door 3 when the supply spool 2 is caused to rotate clockwise. The film spool 2 is integrally provided with a data disk 4 and an indicator. A state of use of the film cartridge can be indicated at the indicator 5 with the stop phase of the film supply spool 2 controlled. The data disk 4 is arranged to indicate in bar codes the ISO sensitivity and a specified number of photographable frames of the film, etc. The film cartridge is arranged to enable the camera to read and detect the state of use of the film cartridge indicated by the indicator 5 according to the stop phase of the film supply spool 2. The state of use of the film cartridge is indicated by the indicator 5 in the following manner. There are provided indication windows 1b, 1c, 1d and 1e which are arranged to show the current state of use of the film cartridge according to the stop phase of the indicator 5. The window 1b indicates an unexposed film, the window 1c indicates a partially exposed film which has some of its frames used already for photographing, the window 1d indicates a fully exposed film which has all frames of it used for photographing, and the window 1e indicates a developed film which has already been developed. The film supply spool 2 is allowed to rotate only when the light-lock door 3 is open as shown in FIG. 6. When the light-lock door 3 is in a closed state as shown in FIG. 5, a lock mechanism (not shown) acts to prevent the film supply spool 2 from being rotated.

In loading the film cartridge in the camera, the film cartridge is held on the film supply spool 2 without touching the film cartridge shell 1. To be more specific, the film cartridge is centered on the shaft parts 2a and 2e and the abutting part 2c abuts on a datum plane provided on the side of the camera. The shaft part 3b of the light-lock door 3 is also used for preventing the film cartridge shell 1 from turning.

Referring to FIGS. 1 and 4, the arrangement of the cartridge loading chamber of the camera according to the embodiment is described as follows. A camera body 6 is provided with fitting holes 6a and 6b for rotatably supporting a spool driving member 7 and an opening-and-closing driving member 12 (operating portion). The spool driving member 7 has a key member 8 and a spring 9 incorporated therein, which are held there by means of a retaining lid 10. A gear part 7a of the spool driving member 7 is arranged to receive a turning force through a gear train (not shown). The spool driving member 7 is arranged to engage with the spool 2 of the film cartridge for positioning the spool 2 and also transmitting its rotation to the spool 2. More specifically, the shaft part 2a of the spool 2 is fitted on the shaft part 7b of the spool driving member 7 and the abutting part 2c is brought into abutment with the datum plane 7c for centering the film cartridge and for axially positioning the film cartridge. Further, the rotation of the spool driving member 7 can be transmitted to the spool 2 with the key way part 2b caused to engage with the key member 8. The spring 9 is provided for stroke absorption of any discrepancy in phase between the key member 8 and the key way part 2b when the film cartridge is loaded. Even if their key phases fail to coincide with each other, their phases eventually come to coincide with each other and then they are caused to engage each other by the force of the spring 9 when the spool driving member 7 is rotated. The rotation of the spool driving member 7 thus can be reliably transmitted to the spool 2.

A cam member 13 (action portion) is mounted on the opening-and-closing driving member 12 in such a way as to rotate integrally with the opening-and-closing driving member 12. The opening-and-closing member 12 is arranged to engage with the light-lock door 3 of the film cartridge so as to prevent the film cartridge from turning and to drive the light-lock door 3 for opening and closing. To be specific, the film cartridge is prevented from turning by causing the shaft part 3b of the film cartridge to fittingly engage with a shaft part 12a of the opening-and-closing driving member 12. The light-lock door 3 is rotated for opening and closing by causing a key part 12b of the opening-and-closing driving member 12 to engage with the engaging part 3c and to rotate in that state. A retaining member 11 is attached to the camera body 6 by a fixing means (not shown). The positions of the spool driving member 7 and the opening-and-closing driving member 12 are restricted in the thrust direction by sandwiching both of them in between the camera body 6 and the retaining member 11. A long fitting engagement hole 6a provided in the camera body 6 is arranged to prevent the spool driving member 7 from falling. The opening-and-closing driving member 12 is prevented from falling with its shaft parts 12c and 12d fittingly engaging respectively with a fitting engagement part 6b of the camera body 6 and a fitting engagement part 11a of the retaining member 11. The camera body 6 has a sliding shaft 6c formed around the outer circumferential side of the fitting engagement hole 6a. The sliding shaft 6c is fitted in a rotation hole 15a of a rotary body 15 and acts as a rotation shaft. A slide member 16 and a transmission member 17 are arranged to rotate integrally with the rotary body 15. Rotary body 15 and slide member 16 constitute a driving portion. A flexible printed circuit board 14 is provided with signal patterns for detecting the rotation phase of the rotary body 15. A photo-reflector (not shown) is disposed on the flexible printed circuit board 14 to read a signal from the data disk 4. An operation part 18 includes an operation mechanism for opening and closing a cover member of the cartridge loading chamber. The transmission member 17 is arranged to be driven through a transmission mechanism part 19 in association with the opening and closing operations of the cover member in the operation part 18.

Referring to FIGS. 1, 2 and 3, a mechanism in which the opening-and-closing driving member 12 is driven by the transmission member 17 driven through the operation part 18 and the transmission mechanism part 19 is next described. The configuration of the mechanism is first described. The opening-and-closing driving member 12 is arranged to be rotatable on the shaft parts 12c and 12d and to have its position restricted with its stopper 12e abutting on stoppers 6d and 6e provided on the camera body 6. A state in which the position of the opening-and-closing driving member 12 is restricted by the stopper 6d, as shown in FIG. 1, corresponds to the closed state of the light-lock door 3 of the film cartridge. A state in which the position of the opening-and-closing driving member 12 is restricted by the other stopper 6e, as shown in FIG. 3, corresponds to the open state of the light-lock door 3. The opening-and-closing driving member 12 engages with the cam member 13 at two-side-cut parts 13b and 12f and is thus arranged to move integrally with the cam member 13. The cam member 13 has a cam part 13a. A gear part 12g of the opening-and-closing driving member 12 is in mesh with a gear part 15b of the rotary body 15. As mentioned above, the rotary body 15 is arranged to rotate on the rotation hole 15a. A phase detection contact piece 20 is mounted on the rotary body 15 and is arranged to rotate integrally with the rotary body 15 so as to permit detection of the phase of the rotary body 15 by sliding over the flexible printed circuit board 14. More specifically, the phase detection contact piece 20 is provided for detection of the state shown in FIG. 3 which corresponds to the open state of the light-lock door 3. The film is allowed to be sent out and photographing is allowed only when this state is obtained.

The slide member 16 is supported in such a way as to be linearly slidable over the rotary body 15. In other words, the slide member 16 is provided with a guide projection 16a which is arranged to be guided by a guide slot 15c provided in the rotary body 15, while a guide part 15d of the rotary body 15 is arranged to guide a guide part 16b of the slide member 16. This arrangement thus permits the slide member 16 to make only a linear sliding motion. A compression coil spring 21 (elastic portion) is arranged to exert an urging force by acting at its one end on a receiving face 15e of the rotary body 15 and at the other end on an arm part 16c of the slide member 16. A cam part 16d of the slide member 16 is arranged to act on the cam part 13a of the cam member 13. The slide member 16 is prevented from coming off by the transmission member 17. The transmission member 17 has a fitting engagement part 17a fittingly engaging a fitting engagement part 15e of the rotary body 15 and has a lock part 17b locked by a lock part 15f of the rotary body 15. In this state, the transmission member 17 is fixedly secured to the rotary body 15 with a screw 22. Although the transmission member 17 is prevented from turning with respect to the rotary body 15 by the screw 22, the position of the transmission member 17 may be set by some other suitable means. A transmission part 17c of the transmission member 17 is arranged to act as an interface part for transmitting a movement coming from the transmission mechanism part 19.

Operation of the configuration described above is next described. In the state shown in FIG. 1, the cam part 16d of the slide member 16 is brought into abutment with the cam part 13a of the cam member 13 by the urging force of the spring 21. The opening-and-closing driving member 12 is urged counterclockwise by this urging force of the spring 21 and is restrained from rotating with its stopper 12e abutting on the stopper 6d of the camera body 6. Under this condition, the light-lock door 3 of the film cartridge is reliably kept in its closed state. When the cover member opening-and-closing operation mechanism of the operation part 18 is operated to unlock and open the cover member of the cartridge loading chamber under this condition, the film cartridge can be loaded or taken out from the cartridge loading chamber.

With the film cartridge loaded, when a locking operation of the cover member is performed at the operation part 18 shown in FIG. 4, the transmission part 17c of the transmission member 17 is driven counterclockwise through the transmission mechanism part 19. As a result, the rotary body 15 and the slide member 16 rotate also counterclockwise integrally with the transmission member 17. At the same time, the intermeshing gear parts 15b and 12g cause the opening-and-closing driving member 12 to rotate clockwise. In this instance, the cam part 13a of the cam member 13 pushes the cam part 16d of the slide member 16 against the urging force of the spring 21 so as to cause the slide member 16 to slide through the above-mentioned guide mechanism. FIG. 2 shows a state obtained when the cam parts 16d and 13a reach a top dead point during the process of such a sliding movement. No rotation moment is generated by the cam parts 16d and 13a in this state. When the transmission part 17c is rotated further counterclockwise, the cam part 13a is pushed by the cam part 16d under the urging force of the spring 21 and the opening-and-closing driving member 12 starts rotating clockwise. Then, the opening-and-closing driving member 12 comes to a stop in the state shown in FIG. 3. In the state shown in FIG. 3, the stopper 12e abuts on the stopper 6e of the camera body 6 to restrict the position of the opening-and-closing driving member 12 in the direction of its rotation. Under this condition, the light-lock door 3 of the film cartridge is reliably kept in its open state. In this instance, the phase detecting contact piece 20 and the flexible printed circuit board 14 cooperate to generate a photographing permission signal, so that the sending-out of the film and the photographing operation are made possible.

In opening the cover member of the cartridge loading chamber by the operation part 18 after photographing, actions are performed in an order reverse to the order of actions described above, changing the state of FIG. 3 to the state of FIG. 2 and then to the state of FIG. 1.

Viewed otherwise, the first embodiment (as well as embodiments hereinafter discussed) includes a driving portion comprised of rotary body 15 and slide member 16, the latter being engagable with an operating portion (member 12) for imparting rotation thereto following predetermined rotation thereof by rotary body 15. The driving portion includes means for storing energy, namely, spring 21 (elastic portion), derivatively from the predetermined rotation of the operating portion. The driving portion will be seen to engage with the operating portion and the urging force of the elastic portion is transmitted through the driving portion to the action portion (cam 13) of the operating portion.

Next, other embodiments of this invention will be described.

Figure 7:
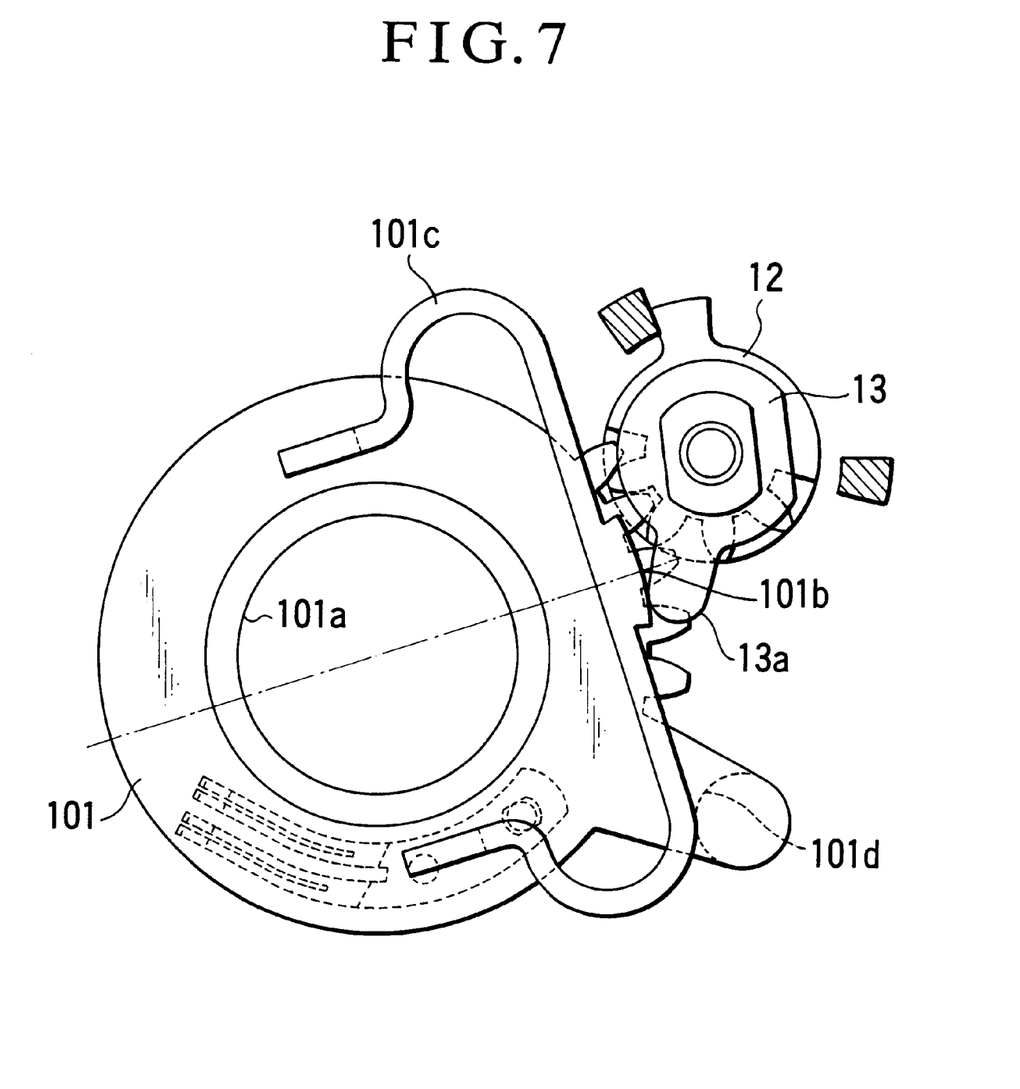
FIG. 7 is a plan view showing the bottom side of a cartridge loading chamber of a camera, as viewed from below, according to a second embodiment of this invention.

FIG. 7 is a plan view showing the bottom side of a cartridge loading chamber of a camera, as viewed from below, according to a second embodiment of this invention. In the case of the second embodiment, an elastic urging means (the slide member 16 and the spring 21) in the first embodiment is modified. In FIG. 7, all parts that are arranged in the same manner as the parts shown in FIG. 1 are indicated by the same reference numerals used for the first embodiment.

Referring to FIG. 7, a rotary body 101 is arranged to rotate on a rotation hole 101a in the same manner as the rotary body 15 in the first embodiment. Since the opening-and-closing driving member 12 and the cam member 13 are arranged in the same manner as in the case of the first embodiment, the details of them are omitted from description. The rotary body 101 is formed by molding a plastic material to be integrally provided with an elastic arm part 101c and a cam part 101b. The cam part 101b is arranged to act on the cam part 13a of the cam member 13 and to function in the same manner as the slide member 16 in the first embodiment, owing to the elastic deformation of the elastic arm part 101c. The rotary body 101 is further provided with a transmission part 101d, which corresponds to the transmission part 17c in the first embodiment.

Figure 8:
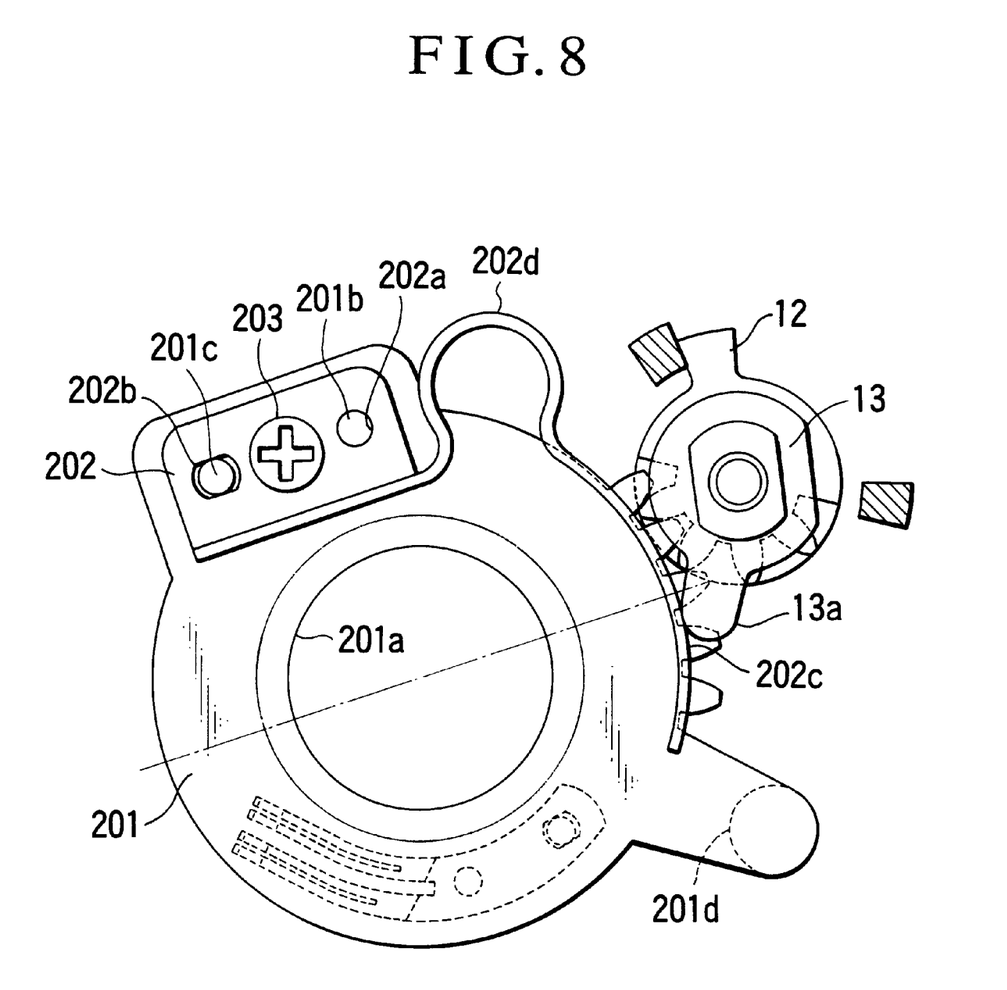
FIG. 8 is a plan view showing the bottom side of a cartridge loading chamber of a camera, as viewed from below, according to a third embodiment of this invention.

FIG. 8 is a plan view showing the bottom side of a cartridge loading chamber of a camera, as viewed from below, according to a third embodiment of this invention. In the third embodiment, as in the second embodiment, the elastic urging means on the first embodiment is modified. In FIG. 8, all parts arranged in the same manner as the parts shown in FIG. 1 are indicated by the same reference numerals as in FIG. 1. Referring to FIG. 8, a rotary body 201 is arranged to rotate on a rotation hole 201a in the same manner as the rotary body 15 in the first embodiment. The opening-and-closing driving member 12 and the cam member 13 are arranged in the same manner as in the case of the first embodiment and, therefore, the details of them are omitted from description. A leaf spring member 202 is mounted on the rotary body 201 with a screw 203. The leaf spring member 202 is positioned by means of positioning bosses 201b and 201c and positioning holes 202a and 202b.

The leaf spring member 202 is provided with an action part 202c which extends from an elastic arm part 202d. The action part 202c of the leaf spring member 202 is arranged to be caused by deformation of the elastic arm part 202d to act on the cam part 13a of the cam member 13. The leaf spring member 202 is thus arranged to function in the same manner as the slide member 16 in the first embodiment. The rotary body 201 is further provided with a transmission part 201d, which corresponds to the transmission part 17c in the first embodiment.

According to the arrangement of each of the embodiments described above, a camera or a cartridge light-shielding cover driving apparatus can be arranged to be capable of reliably driving the light-shielding cover of a film cartridge.

Further, a camera or a cartridge light-shielding cover driving apparatus which is capable of reliably driving the light-shielding cover of a film cartridge can be simply arranged.

Further, a camera or a cartridge light-shielding cover driving apparatus permits efficient utilization of a space for reduction in size of the camera or the apparatus.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the opening-and-closing driving member 12 and the rotary body 15 in the first embodiment are interconnected by means of gears, they may be interconnected by some other suitable means such as use of a chain or the like.

While the slide member 16 is arranged to slide, the arrangement may be changed, in accordance with this invention, to arrange the cam member 13 to slide instead of sliding the slide member 16, or to arrange both the slide member 16 and the cam member 13 to slide. In the case of such a modification, it is necessary to arrange the cam member 13 to be urged by a spring force to slide toward the slide member 16.

The arrangement of each of the embodiments described above is disposed on the side of the cartridge spool driving member at the cartridge loading chamber. In accordance with this invention, however, it may be disposed on the side where a support means for sandwiching the film cartridge together with the cartridge spool driving member is disposed. In this case, the support means is substituted for the spool driving member 7 in each of the embodiments described above.

This invention applies also to an apparatus adapted for use of a cartridge having a movable light-shielding door or an opening-and-closing cover of the type other than the type described in each of the embodiments.

This invention applies also to a cartridge of a type other than the type described in each of the embodiments or to a cartridge containing an image recording medium other than a film. Further, this invention is applicable to a wide range of cartridges of different kinds or to various loading matters having opening-and-closing covers.

This invention may be carried out by combining as necessary the embodiments or their technological elements described in the foregoing.

This invention applies to various cases where either the whole or a part of claims or the arrangement of each embodiment described forms one apparatus or is used in combination with some other apparatus or as a component element of an apparatus.

Further, this invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

I claim:

1. An apparatus adapted to a film cartridge provided with an opening-and-closing cover, comprising:
   a) an operating portion which operates the opening-and-closing cover of the film cartridge by rotating;
   b) a driving portion which rotates said operating portion, said driving portion engaging with said operating portion; and
   c) an elastic portion which is disposed at said driving portion and, through said driving portion, urges said operating portion selectively in a direction in which said driving portion rotates said operation portion.

2. An apparatus according to claim 1, wherein said operating portion is arranged to open and close a light-shielding cover which opens and closes a film egress portion of the film cartridge.

3. An apparatus according to claim 1, wherein said operating portion includes an action portion on which an urging force is acted from said elastic portion such that said operating portion rotates selectively in a first direction and a second direction in accordance with a rotating position of said operating portion.

4. An apparatus according to claim 1, wherein said driving portion is arranged to be rotatable.

5. An apparatus according to claim 4, wherein said driving portion is arranged to be slidable with respect to said operating portion.

6. An apparatus according to claim 4, wherein said driving portion includes a gear portion for rotating said operating portion.

7. An apparatus according to claim 1, wherein said driving portion is disposed around a spool driving portion which drives a film supply spool of the film cartridge.

8. An apparatus according to claim 1, wherein said driving portion is disposed around a support portion which supports a film supply spool of the film cartridge.

9. An apparatus according to claim 1, wherein said driving portion includes a cam portion for causing an urging force of said elastic portion to act on said operating portion.

10. An apparatus according to claim 1, wherein said apparatus includes a camera.

11. An apparatus adapted to a film cartridge provided with an opening-and-closing cover, comprising:
    a) an operating portion which operates the opening-and-closing cover of the film cartridge by rotating;
    b) a driving portion which rotates said operating portion, said driving portion engaging with said operating portion;
    c) an elastic portion; and
    d) an action portion to which an urging force of said elastic portion is transmitted through said driving portion and rotates said operating portion selectively in a first direction and a second direction in accordance with a rotating position of said operating portion.

12. An apparatus according to claim 11, wherein said operating portion is arranged to open and close a light-shielding cover which opens and closes a film egress portion of the film cartridge.

13. An apparatus according to claim 11, wherein said driving portion is arranged to be rotatable.

14. An apparatus according to claim 13, wherein at least one of said driving portion and said operating portion is arranged to be slidable.

15. An apparatus according to claim 13, wherein said driving portion includes a gear portion for rotating said operating portion.

16. An apparatus according to claim 11, wherein at least one of said driving portion and said operating portion is arranged to be slidable.

17. An apparatus according to claim 11, wherein said driving portion is disposed around a spool driving portion which drives a film supply spool of the film cartridge.

18. An apparatus according to claim 11, wherein said driving portion is disposed around a support portion which supports a film supply spool of the film cartridge.

19. An apparatus according to claim 11, wherein said driving portion includes a cam portion for causing an urging force of said elastic portion to act on said operating portion.

20. An apparatus according to claim 11, wherein said apparatus includes a camera.

21. An apparatus adapted to a image recording medium cartridge provided with an opening-and-closing cover, comprising:

a) an operating portion which operates the opening-and-closing cover of the image recording medium cartridge by rotating;

b) a driving portion which rotates said operating portion, said driving portion engaging with said operating portion; and c) an elastic portion which is disposed at said driving portion and, through said driving portion, urges said operating portion selectively in a direction in which said driving portion rotates said operation portion.

22. An apparatus adapted to a image recording medium cartridge provided with an opening-and-closing cover, comprising:

a) an operating portion which operates the opening-and-closing cover of the image recording medium cartridge by rotating;

b) a driving portion which rotates said operating portion, said driving portion engaging with said operating portion;

c) an elastic portion; and d) an action portion which is translated relative to said driving portion under an urging force of said elastic portion transmitted through said driving portion and rotates said operating portion selectively in a first direction and a second direction in accordance with a rotating position of said operating portion.

* * * * *